United States Patent

Lehman

[15] 3,675,531
[45] July 11, 1972

[54] RELEASABLE PANEL FASTENER

[72] Inventor: Kenneth G. Lehman, Easton, Conn.
[73] Assignee: Norco, Inc., Ridgefield, Conn.
[22] Filed: May 21, 1970
[21] Appl. No.: 39,480

[52] U.S. Cl. ............................................... 85/70
[51] Int. Cl. ........................................... F16b 13/06
[58] Field of Search .............. 85/70, 71; 24/221 A, 221 R

[56] References Cited

UNITED STATES PATENTS

| 2,442,064 | 5/1948 | Veit | 24/221 A |
| 2,688,894 | 9/1954 | Modrey | 85/70 |
| 3,279,302 | 10/1966 | Modrey | 85/70 |
| 2,278,217 | 3/1942 | Rodanet | 85/70 |
| 2,807,854 | 10/1957 | Mellen et al. | 24/221 A |
| 2,904,288 | 9/1959 | Krauss et al. | 85/7 |

FOREIGN PATENTS OR APPLICATIONS

| 1,199,737 | 6/1959 | France | 85/70 |

Primary Examiner—Edward C. Allen
Attorney—H. Gibner Lehmann

[57] ABSTRACT

A releasable stud-type fastener adapted to be turnable in and extend through an opening of a panel and project therefrom at right angles so as to be receivable in an aligned opening of another panel which has a larger hole or opening. The fastener comprises a smooth-shanked headed stud having at one end a slotted or flatted head or enlargement adapted to be engaged by a tool for the purpose of turning the stud after it occupies the aligned holes of the panels with its head in engagement with the one panel. On its shank the stud carries a soft rubber bushing or sleeve having a normal outside diameter small enough to pass through the larger opening of the second panel but too large to pass through the first panel which can thereby be gripped between the rubber sleeve and stud head. In addition to the rubber sleeve on the stud shank there are two annular or rotary cam collars having facing camming surfaces which are engageable with each other to move the collars apart in response to relative rotary motion. The back end of one of the cam collars (which is turnable on the stud) is engaged with one end of the (also turnable) rubber sleeve, and the other cam collar is drivingly affixed to the small end of the stud. The outside diameters of the cam collars are also small enough to pass through the large hole of the second panel. Normally the cam collars and rubber sleeve hold the stud perpendicular to the face of the first panel. To secure the two panels together, that with the large hole is slipped over the cam collars and the rubber bushing and brought against the panel on which the fastener is mounted. The fastener stud is then turned by an appropriate tool such as a screwdriver or wrench. This drives or turns the affixed cam collar, and causes relative turning movement between the collars whereby they separate in such a manner that the rubber bushing is axially compressed and enlarged radially. The radial enlargement makes its outside diameter or circumference larger than the large hole through which it was passed (in the second mentioned panel), whereby the latter will now be securely gripped and held tightly against the first panel. Small interlocking shoulders on the cam surfaces of the cam collars maintain the same in their locking position separated from each other and expanding the rubber bushing. To release the panels, the stud head is merely turned in the opposite direction, forcing opposite relative turning of the cams to occur, which enable them to move toward each other, this being accompanied by restoration of the rubber sleeve to its normal diametric size whereby the panel with the large opening can now be readily slipped from the sleeve and cam collars so as to be released from the other panel.

9 Claims, 12 Drawing Figures

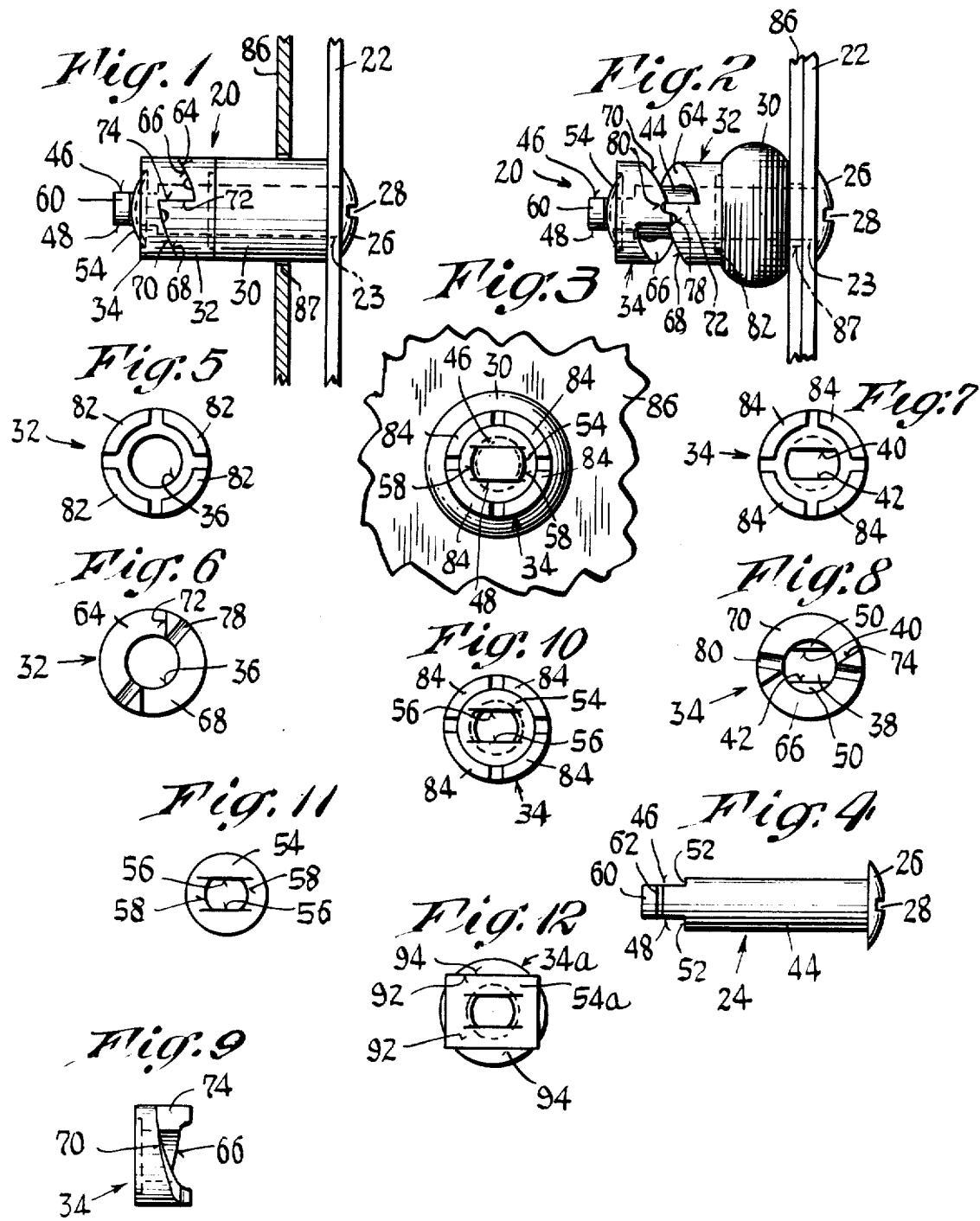

RELEASABLE PANEL FASTENER

BACKGROUND

This invention relates to releasable fastener devices normally considered of the captive type, in the form of studs which are carried by one panel or plate and which can be passed through openings in another panel or plate to bring the panels together, whereupon a turning of the stud of the fastener causes radial expansion of a rubber sleeve carried thereby, effecting a locking of the panels to each other.

Prior fasteners of this type comprised a headed stud having a radially expansible soft rubber bushing or sleeve. Also disposed on the shank of the stud against the rubber sleeve was a rotary cam collar, and the stud was provided with a slot in its small end, in which there was carried a cam follower cross piece, the latter being slidable and pivotal about a cross pin disposed in the slot of the shank. To assemble the fastener, the cross piece was aligned with the shank of the stud and the latter passed through a small panel opening, after which the rubber sleeve and rotary cam were slipped onto the stud shank. Thereafter, the cam follower cross piece had to be manipulated about the cross pin in such a manner that it presented its two arms for engagement with cam surfaces of the cam collar. Then the turning of the stud could cause the follower arms to travel on the sloping cam surfaces, forcing the rotary cam against the rubber bushing and expanding the latter radially whereby it gripped a panel carried thereby. While this construction operated satisfactorily, it represented a considerable cost for the reason that the shank of the stud had to be slitted and then provided with a cross pin, and for the further reason that the cross piece or cam follower was an expensive and difficult part to make, being formed either of hardened wire or as a hardened metal stamping requiring a number of operations not only to form it but also to assemble it to the shank of the stud. In addition to these drawbacks the manipulations required of the user in order to assemble the fastener to the panel, and to assemble the rubber sleeve and cam on the stud and thereafter position the cross arms of the cam follower required special tools and a special technique. As a consequence, the overall cost of the fastener was quite considerable and not in line with the demand or sales volume.

SUMMARY

The above disadvantages and drawbacks of prior captive releasable panel fasteners are obviated by the present invention, which has for its main object the provision of an improved turnable-stud type, expansible sleeve fastener wherein the fabricating cost is greatly reduced and brought to a very low figure while at the same time the reliability and operating characteristics of the fastener are maintained at a high level, comparable with that of prior fasteners. This is accomplished by the provision of a fastener comprising a headed stud having at its small end a pair of oppositely disposed keying flats instead of a milled slot. On the stud there is carried a soft rubber expansible sleeve, and also a pair of very similar rotary cam collars which can be virtually identical or duplicates of each other (with only minor exceptions). The cam collars are carried by the shank with their cam surfaces facing each other.

One of the cam collars has a bore provided with flats by which it is keyed to the flatted portion of the shank of the stud. This cam collar is retained on the flattened end of the stud by a slotted spring washer, known commercially as a "Tinnerman" (a registered trademark) washer or fastener. The configuration of the stud, being devoid of a slotted end which is an expensive operation, results in a reduced fabricating cost since the formation is done mostly by a well known heading operation. Since the cam collars are virtually duplicates of each other, the cost of fabricating and the tooling cost involved with the camming means or collars are greatly reduced. The slotted spring washers, being commercially available in great quantities, represent an inappreciable expense. By virtue of the provision of the cam collars wherein one acts as a follower, there is eliminated the expensive follower cross piece which heretofore was utilized to constitute the follower member for the cam and which constituted an appreciable fabricating cost as well as requiring a difficult assembly operation. In addition to this, there has been eliminated the cross pin which previously was provided in the slotted end of the stud. In consequence, the parts are few in number and also the cost of producing and assembling them has been greatly reduced.

Other features and advantages of the invention reside in the provision of an improved quick releasable panel fastener as above characterized, wherein a positive drive arrangement is had while relatively few parts are involved, and wherein sub-assemblies may be utilized to further reduce the assembly cost.

Still other features and advantages will hereinafter appear.

In the drawings, illustrating several embodiments of the invention:

FIG. 1 is a side elevational view of an improved panel fastener as provided by the invention, shown mounted on one panel and in the process of being inserted in an opening of another panel which is intended to be secured to the first panel.

FIG. 2 is a side elevational view like that of FIG. 1, but showing the second panel engaged with the first panel, and showinG the fastener after it has been actuated to secure the panels together by separation of the rotary cams and expansion of the rubber fastening sleeve.

FIG. 3 is a rear or back elevational view of the assemblage of FIG. 2, wherein the two panels are secured together by the expanded rubber sleeve.

FIG. 4 is a side elevational view of the stud portion of the fastener.

FIG. 5 is an end elevational view of the inner one of the rotary cam collars of the fastener.

FIG. 6 is an elevational view of the other end of the rotary cam collar of FIG. 5.

FIG. 7 is an outer end elevational view of the outer one of the cam collars of the fastener, illustrating the flatted opening provided for keying purposes.

FIG. 8 is an inside end elevational view of the outer one of the cam collars, that shown in FIG. 7.

FIG. 9 is a side elevational view of the outer cam collar of FIGS. 7 and 8.

FIG. 10 is an end elevational view of the outer cam collar, having assembled to it the slitted spring washer or Tinnerman fastener.

FIG. 11 is a top plan view of the slitted spring washer or Tinnerman fastener.

FIG. 12 is an end elevational view of an outer cam collar and a rectangular Tinnerman washer assemblage, constituting another embodiment of the invention.

Referring first to FIG. 1, there is illustrated an assembled fastener designated generally by the numeral 20, said fastener being carried by an apertured panel 22 having an opening 23, and the fastener comprising a headed stud 24 closely fitted in the opening 23 and having an oval head 26 provided with a screwdriver slot 28 by which it can be turned while carried by the panel 22. On the stud 24 there is a normally cylindrical soft rubber sleeve 30 which is axially compressible and radially expansible as illustrated in FIG. 2. In accordance with the present invention, also carried by the shank of the stud 24 is a pair of substantially identical inner and outer cam collars 32, 34 respectively. The cam collars 32, 34 may be identical except that the collar 32 has a perfectly round or circular bore 36 whereas by this invention the cam collar 34 has a round bore portion 38 and a flatted or spline-type bore portion having a pair of oppositely disposed splines or flats 40, 42. The flatted bore 40, 42 of the outer cam 34 accommodates the small end portion of the shank 44 of the stud 24, said end portion having oppositely disposed flats 46, 48 which respectively engage the flats 40, 42 and effect a keying or splining of the outer cam collar 34 to the shank 44 of the stud 24. The provision of the flats 40, 42 result in internal shoulders 50 in the bore of the cam collar 34 which are engageable with shoulders 52 of the shank 44 of the stud, thereby to axially position the outer cam collar 34 on the stud and prevent relative axial movement. The outer cam collar 34 is retained in such position by a slit spring washer or Tinnerman (registered trademark) fastener 54 of bowed configuration having flats 56 which engage the flats 46, 48 of the end of the shank 44 of the stud 24. The spring washer 54 has sharp curved edges 58 which are engageable with rounded opposite surfaces 60 of the shank end, and which in accordance with the invention are received in grooves 62 provided in said rOunded suRfaces, thereby to lock the spring washer on the shank and prevent its removal once it has been installed.

The inner and outer cam collars 32, 34 have cooperable sloping cam faces 64, 66 and 68, 70 respectively extending through substantially equal arcs in circumferential directions, and have pairs of cooperable stop shoulders 72, 74 respectively. Small depressions 78, 80 respectively in the sloping cam surfaces 68, 70 provide a detent action as illustrated in FIG. 2, by which the cam collars 32, 34 when once separated in response to relative turning movement, will tend to remain in the separated positions shown.

With the above constructions it will now be understood that the outer cam collar 34 is keyed to the small end of the shank 44 of the stud 24 by virtue of the flats 46, 48 on the shank end, and the flats 40, 42 in the bore of the cam collar.

The inner cam collar 32 has on its end surfaces a plurality of circular segments or ledges 82 which are adapted to bite into the end surface of the soft rubber sleeve 30. Likewise, the outer cam collar 34 has a plurality of circular segments or ledges 84 and these are so arranged that the spring washer 54 can be press-fitted between the segments 84 and retained therein to constitute a sub-assemblage such as is illustrated in FIG. 10. In such assemblage it will be noted that the flats 56 of the washer 54 are aligned with the flats 40, 42 in the bore of the cam collar 34.

The operation of the improved fastener of the present invention may now be readily understood. The fastener parts are first assembled to the panel 22 by passing the shank 44 of the stud 24 through the close fitting opening 23 in the panel 22. Thereafter, the rubber sleeve 30 is placed on the shank 44 and then the inner and outer cam collars 32, 34 are added. The rubber sleeve 30 thus adjoins the head 26 of the stud 24, and is disposed between the head and the cam collars 32, 34. The outer cam collar 34, havinG assembled to it the spring washer 54, must be forced onto the shank so as to bring the curved sharp edges 58 of the spring washer into the retaining grooves 62 in the end of the shank 44. Both of the collars 32, 34 are separate from and loosely carried by the stud 24. The assembled parts will now appear as in FIG. 1, with the exception that the second panel designated by the numeral 86 will be absent. This is the panel to which the first panel 22 is to be secured. The panel 86 has a much larger opening 87 than the opening 23 in the panel 22, this opening 87 being sufficiently large to enable the panel 86 to be slipped over the assembled cams 32, 34 and rubber sleeve 30 prior to the latter being radially expanded, all as illustrated in FIG. 1. The panel 86 is brought against the back of the panel 22 and in tight engagement therewith, and thereafter the stud 24 is turned in a clockwise direction by the application of a screw-driver bit to the slotted head 26. The inner cam collar 32 will not rotate since the segments 82 thereof will be partially embedded in the rubber sleeve 30 and since there is considerable friction between such sleeve and the panel 22. Therefore the inner cam collar 32 will remain stationary. However, the outer cam collar 34, being keyed to the shank 44 of the stud 24, will be turned in a counterclockwise direction as viewed from the left of FIG. 1, while the stud 24 is being turned clockwise as viewed from the right of FIG. 1, and the cams will tend to separate in the manner illustrated in FIG. 2 due to the cam surfaces riding up on each other. A point will be reached where the high portions of the cam surfaces will occupy the small notches 78, 80 provided in the complementary surfaces, thereby constituting a detent action and retaining the cams in the separated positions of FIG. 2. The separation of the cams will cause axial compression of the rubber bushing 30 and will also cause the latter to expand radially to a considerable extent as shown in FIG. 2 whereby it becomes larger in diameter than the opening 87 of the panel 86, thereby to securely lock such panel against the panel 22.

Another embodiment of the invention is illustrated in FIG. 12, wherein there is shown an outer cam collar 34a and a rectangular spring fastener or Tinnerman washer 54a, the latter having straight oppositely disposed sides 92 and being recessed in the end of the cam collar 34a by which the side edges 92 engage shoulders 94 of the cam 34a. In this manner, the Tinnerman washer 54a is keyed to the shank 44 and also keyed to the outer plastic Delrin cam 34a to a more secure keying or splining of the cam collar 34a to the stud 24.

It will now be understood from the foregoing that I have provided a novel and improved, greatly simplified separable fastener for panels and the like, wherein relatively few parts are involved, wherein two rotary cams are utilized which are substantially duplicates of each other with the exception of a small change in the bore configuration of one cam with respect to the other. The configuration of the stud 24 is such that it can be economically formed by a simple headinG operation, with subsequent quick and simple machining prOcedures. By virtue of the assemblage of the inexpensive Tinnerman washer 52 to the outer cam 34, the handling of parts is simplified during the assembly of the fastener, particularly by the user who cannot confuse the order of assemblage of the cams. Directions will advise the user to first place the stud 24 through the opening 23 of the panel 22, thereafter apply the rubber sleeve 30 to the stud, then apply the inner cam collar 32 which is the only one that can be brought fully against the end surface of the rubber sleeve 30. Finally, the outer cam collar 34 which has the spring washer 54 is forcibly applied to the flatted end of the stud 24, completinG the assembly by the user. Thereafter, the operation of the fastener to secure two panels together or to release the same is essentially as described. It will be understood that reverse turning of the stud 24 will effect release of the fastener since the cam collars 32, 34 experience relative opposite turning movements. The relative reverse turning movement of the cam collars overcomes the resistance or detent effect of the small depressions 78, 80 and enables the cams to reclose, so to speak, whereby the rubber sleeve 30 will assume its initial cylindrical configuration as illustrated in FIG. 1.

Variations and modifications are possible without departing from the spirit of the invention.

I claim:

1. A releasable panel fastener comprising, in combination:
   a. a stud having a shank and at one end thereof a head, said head having means to accommodate a tool for turning the stud,
   b. a soft rubberlike sleeve directly on and directly engaging the stud, said sleeve being axially compressible and radially expansible,
   c. a pair of coaxial aligned annular rotary cam collars, both of said collars being separate from and loosely carried by the stud, said collars having identical frontal cooperable facing cam surfaces, both surfaces extending through equal arcs in circumferential directions, said collars being disposed directly on and directly engaging said stud, the back end of one cam collar engaging one end of said compressible sleeve and said one cam collar being turnable with respect to said stud, said rubber sleeve adjoining the head of the stud and disposed between said head and said cam collars, and
   d. means integral with the other cam collar, permanently keying the same to the other end of said stud against relative turning thereon, said stud having means disposed on its end opposite the head thereof, for permanently retaining said other cam collar thereon against relative axial movement in a direction off the said opposite end of the stud, e. one cam face of the collars having a detent notch engageable with portions of the cooperable collar to retain the collars in those relative rotative positions wherein they are axially spaced apart.

2. A panel fastener as in claim 1, wherein:
a. said keying means comprises a flat on the shank of the stud and a cooperable flat in the bore of said other cam collar.

3. A panel fastener as in claim 1, wherein:
a. said keying means comprises cooperable spline means on the stud shank and in the bore of said other cam collar.

4. A panel fastener as in claim 3, and further including:
a. means comprising a slitted spring washer of bowed configuration gripping the shank of the stud, for restraining axial movement of said other cam collar on the stud.

5. A panel fastener as in claim 4, wherein:
a. the shank of the stud has notches engaged by edges of the bowed spring washer to lock the latter on the shank against removal.

6. A panel fastener as in claim 1, wherein:
a. the cam collars each have a pair of respectively engageable sloping cam faces.

7. A releasable panel fastener comprising, in combination: a) a stud having a shank and at one end thereof a head, said head having means to accommodate a tool for turning the stud, b) a soft rubber-like sleeve on the stud, said sleeve being axially compressible and radially expansible, c) a pair of coaxial aligned annular rotary cam collars having frontal cooperable facing cam surfaces, disposed on said stud, the back end of one cam collar engaging one end of said compressible sleeve and being turnable with respect to said stud, d) means keying the other cam collar to the other end of said stud against relative turning thereon, said other cam collar being retained on the stud against relative axial movement, e) said keying means comprising cooperable spline means on the stud shank and in the bore of said other cam collar, f) means comprising a slitted spring washer gripping the shank of the stud, for restraining axial movement of said other cam collar on the stud, g) the means restraining axial movement of said other cam collar comprising cooperable shoulders on the collar and shank of the stud.

8. A panel fastener as in claim 7, and further including:
a. means retaining the spring washer assembled to said other cam collar.

9. A panel fastener as in claim 7, and further including:
a. means keying the spring washer to the stud shank against turning thereon, and
b. means keying the spring washer and said other cam collar against relative turning.

* * * * *